June 23, 1925.
C. J. COBERLY
1,543,471
OXYGEN CONTROL LEVER FOR OXYACETYLENE CUTTING TORCHES
Filed June 7, 1923
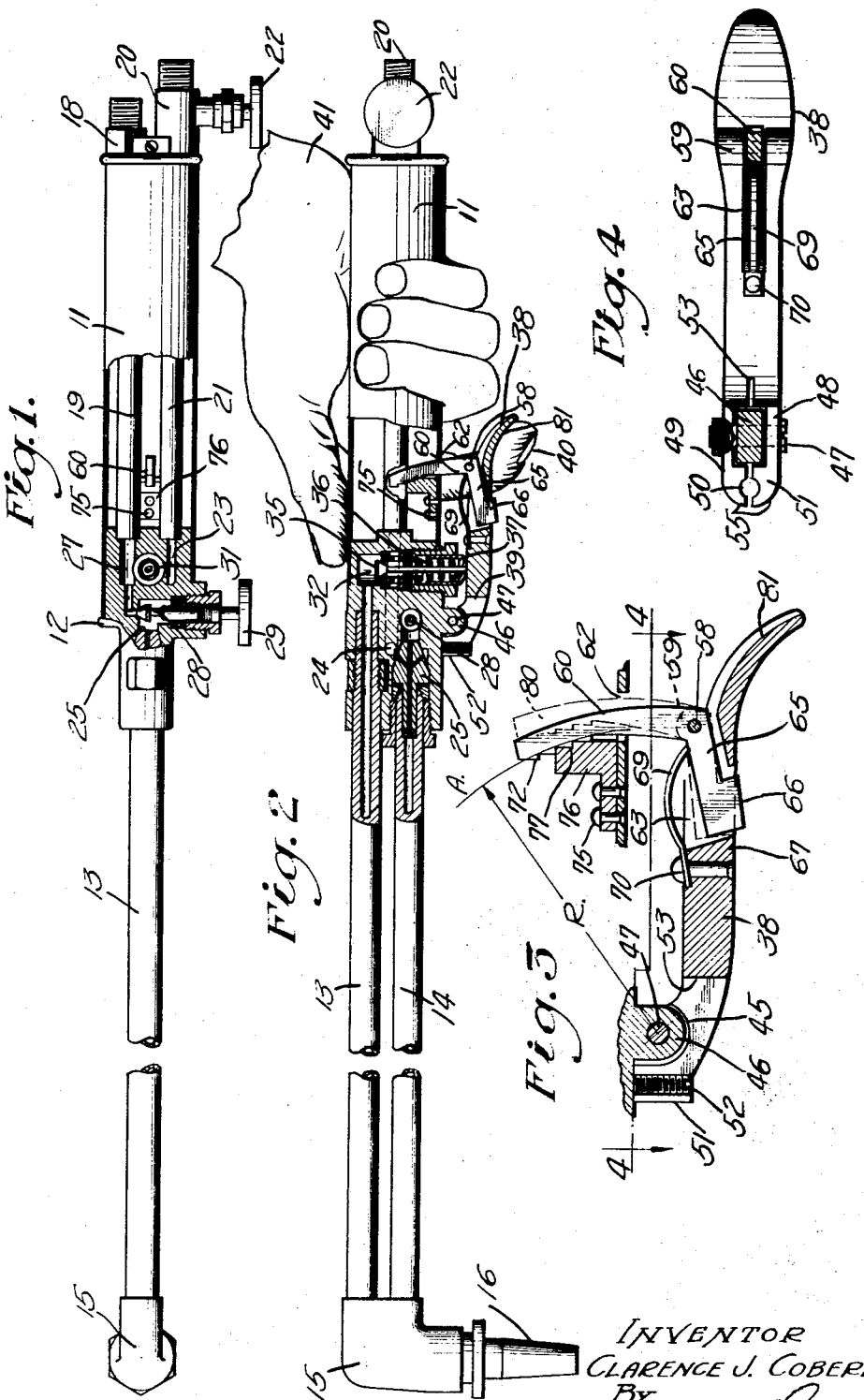
INVENTOR
CLARENCE J. COBERLY
BY
Graham + Davis
ATTORNEYS Patented June 23, 1925.

1,543,471

UNITED STATES PATENT OFFICE.

CLARENCE J. COBERLY, OF LOS ANGELES, CALIFORNIA, ASSIGNOR, BY MESNE ASSIGNMENTS, TO PUROX COMPANY, OF DENVER, COLORADO, A CORPORATION OF COLORADO.

OXYGEN-CONTROL LEVER FOR OXYACETYLENE CUTTING TORCHES.

Application filed June 7, 1923. Serial No. 643,938.

*To all whom it may concern:*

Be it known that I, CLARENCE J. COBERLY, a citizen of the United States, residing at Los Angeles, in the county of Los Angeles, State of California, have invented a new and useful Oxygen-Control Lever for Oxyacetylene Cutting Torches, of which the following is a specification.

This invention relates to oxygen cutting torches provided with a means for pre-heating metal and means for directing a flow of oxygen against the pre-heated portion for the purpose of cutting the metal.

In these cutting torches, a cutting tip is provided having a central opening through which a stream of oxygen may be delivered under pressure, and surrounding this oxygen passage are disposed small orifices through which a combustible mixture of oxygen and hydrogen or carbonaceous gas, generally acetylene, is delivered for providing a flame with which to pre-heat the metal desired to be cut, and to protect the stream of oxygen. The control of the flow of oxygen is accomplished by means of a lever situated in or adjacent to the grip of the torch so that it may be manually operated to cause the delivery of the flow of oxygen after the metal has been pre-heated by the oxy-acetylene flame.

It is an object of the invention to provide an improved form of oxygen control lever, having a novel form of latch means for maintaining the lever in depressed position. This latch means is so constructed that the lever may be maintained in various degrees of depression so that the amount of oxygen allowed to flow may be gauged to suit the thickness of the metal being cut.

A further object of the invention provides a novel screw adjustment for preventing the lever from swinging loosely and to permit the adjustment of the lever tightly against the valve member so as to prevent lost motion therebetween.

It is a further object of the invention to provide the latch member in such a form that it will not interfere with the manipulation of the lever, and may be readily released when it is desired to cut off the flow of oxygen.

The especial advantages of the invention and further objects thereof will be made evident hereinafter.

Referring to the drawing which is for illustrative purposes only:

Fig. 1 is a partially sectioned plan view of a cutting torch embodying the invention.

Fig. 2 is a partially sectioned elevation of the cutting torch.

Fig. 3 is an enlarged longitudinal section through the control lever.

Fig. 4 is a section taken substantially upon the plane represented by the line 4—4 of Fig. 3.

The torch with which my invention is illustrated in the drawings, provides a grip or handle 11, having a head 12 situated in the forward end thereof from which delivery tubes 13 and 14 extend to the burner head 15 which supports the cutting tip 16. The oxygen is delivered through a hose which is attached to a fitting 18, situated at the rear end of the grip 11, and from thence is conveyed to the head 12 by a tube 19 which extends within the grip 11. Acetylene or other carbonaceous gas is supplied through a hose which attaches to a fixture 20 and is conveyed therefrom through a tube 21 to the head 12. The flow of acetylene is controlled by a valve situated in the fixture 20 and operated by a knob 22. The acetylene from the tube 21, flows through a passage 23 directly to an annular space 24 which communicates with the passages in a mixer 25. The oxygen, however, is delivered from the tube 19 to a passage 27 which communicates with an oxygen valve 28, provided with a knob 29 for controlling the flow of oxygen through the mixer 25, and also communicates with an oxygen valve 31 which may be opened to permit a flow of pure oxygen through a passage 32 which communicates with the tube 13 and is thereby conveyed to the cutting tip. The valve 31 is provided with a closure member 35, held firmly against the seat by a spring 36 placed within a cap 37 which is situated in a cup fixture 39 which threads into the lower side of the head 12, as shown in Fig. 2.

From inspection of Fig. 2, it will be made evident that by forcing the cap or cup member 37 upwardly, the closure member 35 may be removed from the seat, thus permitting a flow of oxygen into the passage 32. For the purpose of operating the valve, a lever 38 is provided which rests against the lower end of the cup 37 and forces the cup inwardly when the lever 38 is manually depressed toward the grip 11 under which it extends, which depression may be accomplished by the index finger 40 of the hand 41 gripping the handle portion 11 of the torch. The lever 38 has a recess 45 formed in the upper side thereof near the forward end, into which a downwardly extending projection 46 formed on the under side of the head 12 extends, a pivot pin 47 being extended through openings provided in side walls 48 enclosing the recess 45 and having a nut 49 threaded on the end thereof and bearing against a lock washer. A threaded vertical opening 50 is provided in the forward end 51 of the lever into which an adjustment screw 52 is placed and a slot is cut centrally in the forward end of the lever and extends back to a point 53, thus forming a pair of forks 55 at the forward end of the lever. The screw 52 has the function of limiting the outward rotation of the lever 38 so that the lever will not swing away from the end of the cup 37 and cause a play in the movement of the lever. It is a novel feature of the construction to so arrange the parts that by tightening the pin 47, the forks 55 are drawn pressurably together upon the threaded pin 52 so as to grip it tightly and to prevent its working loose in the opening 50 in which it is threaded. Pivoted upon a pin 58 extending between lugs 59 formed upon the inner side of the lever and near the rearward end thereof is an arcuated latch lever 60 which extends upwardly through an opening 62 formed on the lower side of the grip member 11. An opening 63 is provided centrally in the handle 38 at a point just forward of the pivot pin 58 and an arm having a downwardly extending portion 66 resides in the opening 63, the downwardly projecting portion thereof extending outwardly beyond the lower face 67 of the lever 38 when the arm 65 is depressed by a spring member 69 secured to the inner side of the lever by a rivet 70.

The forward edge of the lever 60 is provided with a series of evenly spaced ratchet teeth 72 which are disposed upon an arc A generated upon the radius arm R which rotates about the center of the pin 47 upon which the lever 38 pivots. It will be recognized that when the lever 38 is depressed, the ratchet teeth 72 will move upwardly along the arc A. Secured to the inside of the grip member 11 by rivets 75 and disposed adjacent to the opening 62 is a stationary cooperating latch plate 76 having ratchet teeth 77 formed upon the rearward face thereof in arcuated arrangement which are engageable by the ratchet teeth 72. When the lever 60 is in the forward position shown in full lines in Figs. 2 and 3, it is evident that when the lever 38 is drawn upwardly by the finger 40 the ratchet teeth 72 will ride over the ratchet teeth 77 and will prevent the lever from swinging downwardly until released by forcing the projection 66 inwardly against the action of the spring 69 which results in swinging the lever 60 into position indicated by the dotted lines 80 out of engagement with the stationary member 76. By the multiple tooth arrangement shown and by disposing the teeth along the arc generated by rotation around the pin 47, it is possible to provide a very durable catch mechanism which will not readily wear so as to slip. By providing a downward curve to the rearward end of the lever 38 as indicated at 81 and extending this rearward end somewhat beyond the releasing projection 66, ample room is provided for the engagement of the finger 40 to raise the lever 38. The mulitple ratchet tooth arrangement provides an efficient means for maintaining the lever in various positions of depression so as to set the valve in a position to give the desired flow of oxygen.

I claim as my invention:

1. In a control lever arrangement of the class described, the combination of: a projection; a control lever having a recess receiving said projection and a slot formed therein passing across said recess and dividing said lever into co-extensive portions adjacent to said recess; an adjustment pin threaded between said co-extensive portions; and a pivot bolt passing through said co-extensive portions and said projection, the tightening of said bolt serving to clamp said co-extensive portions upon said adjustment pin.

2. In a control lever arrangement of the class described, the combination of: a projection; a control lever having a recess near the forward end thereof receiving said projection and having a slot extending from said forward end rearwardly across said recess and dividing said forward end into co-extensive forks; an adjustment member between the forward ends of said forks; and a pivot bolt extending through said forks and said projection, the tightening of said bolt serving to clamp said forks upon said adjustment member.

3. In a control lever arrangement of the class described, the combination of: a projection; a control lever having a recess near the forward end thereof receiving said projection and having a slot extending from said forward end rearwardly across said recess and dividing said forward end into co-extensive forks; an adjustment member consisting of a threaded pin situated between the forward ends of said forks; and a pivot bolt extending through said forks and said projection, the tightening of said bolt serving to clamp said forks upon said adjustment member.

4. In a control lever arrangement of the class described, the combination of: a projection; a control lever having a recess near the forward end thereof receiving said projection and having a slot extending from said forward end rearwardly across said recess and dividing said forward end into co-extensive forks; an adjustment member disposed between said forks; and a pivot bolt extending through said forks and said projection, the tightening of said bolt serving to clamp said forks upon said adjustment member.

5. In a control lever arrangement of the class described, the combination of: a projection; a control lever having a recess near the forward end thereof receiving said projection and having a slot extending from said forward end rearwardly across said recess and dividing said forward end into co-extensive forks; an adjustment member between the forward ends of said forks; a pivot bolt extending through said forks and said projection, the tightening of said bolt serving to clamp said forks upon said adjustment member; a lock member comprising a longitudinal portion and an outstanding portion having ratchet teeth formed thereupon, said lock member being pivoted on said lever in such a position that said longitudinal portion projects beyond the face of said lever so as to be compressible when said lever is pressed inwardly; and a stationary latch member arranged to be engaged by the outstanding portion of said lock member.

6. In a control lever arrangement of the class described, the combination of: a projection; a control lever having a recess near the forward end thereof receiving said projection and having a slot extending from said forward end rearwardly across said recess and dividing said forward end into co-extensive forks; an adjustment member disposed between said forks; a pivot bolt extending through said forks and said projection, the tightening of said bolt serving to clamp said forks upon said adjustment member; a lock member comprising a longitudinal portion and an outstanding portion having ratchet teeth formed thereupon, said lock member being pivoted on said lever in such a position that said longitudinal portion projects beyond the face of said lever so as to be compressible when said lever is pressed inwardly; and a stationary latch member arranged to be engaged by the outstanding portion of said lock member.

7. In a control lever arrangement of the class described, the combination of: a projection; a control lever having a recess near the forward end thereof receiving said projection and having a slot extending from said forward end rearwardly across said recess and dividing said forward end into co-extensive forks; an adjustment member disposed between said forks; a pivot bolt extending through said forks and said projection, the tightening of said bolt serving to clamp said forks upon said adjustment member; a lock member comprising a longitudinal portion and an outstanding portion having ratchet teeth formed thereupon in arcuated arrangement, said lock member being pivoted on said lever in such a position that said longitudinal portion projects beyond the face of said lever so as to be compressible when said lever is pressed inwardly; and a stationary latch member arranged to be engaged by the outstanding portion of said lock member.

8. In a control lever arrangement of the class described, the combination of: a projection; a control lever having a recess near the forward end thereof receiving said projection and having a slot extending from said forward end rearwardly across said recess and dividing said forward end into co-extensive forks; an adjustment member between the forward ends of said forks; a pivot bolt extending through said forks and said projection, the tightening of said bolt serving to clamp said forks upon said adjustment member; a lock member comprising a longitudinal portion and an outstanding portion, said lock member being pivoted on said lever in such a position that said longitudinal portion projects beyond the face of said lever so as to be compressible when said lever is pressed inwardly; and a stationary latch member arranged to be engaged by the outstanding portion of said lock member.

9. In a control lever arrangement of the class described, the combination of: a projection; a control lever having a recess near the forward end thereof receiving said projection, an opening near the center thereof, and having a slot extending from said forward end rearwardly across said recess and dividing said forward end into co-extensive forks; an adjustment member between the forward ends of said forks; a pivot bolt extending through said forks and said projection, the tightening of said bolt serving to clamp said forks upon said adjustment member; a lock member comprising a longitudinal portion and an outstanding portion having ratchet teeth formed thereupon, said lock member being pivoted on said lever in such a position that said longitudinal portion projects through said opening and beyond the face of said lever so as to be compressible when said lever is pressed upwardly; and a stationary latch member arranged to be engaged by the outstanding portion of said lock member.

10. In a control lever arrangement of the class described, the combination of: a projection; a control lever having a recess near the forward end thereof receiving said projection, an opening near the center thereof, and having a slot extending from said forward end rearwardly across said recess and dividing said forward end into co-extensive forks; an adjustment member disposed between said forks; a pivot bolt extending through said forks and said projection, the tightening of said bolt serving to clamp said forks upon said adjustment member; a lock member comprising a longitudinal portion and an outstanding portion having ratchet teeth formed thereupon in arcuated arrangement, said lock member being pivoted on said lever in such a position that said longitudinal portion projects through said opening and beyond the face of said lever so as to be compressible when said lever is pressed inwardly; and a stationary latch member arranged to be engaged by the outstanding portion of said lock member.

11. In a control lever arrangement of the class described, the combination of: a control lever pivotally sustained; a lock member comprising a longitudinal portion and an outstanding portion having ratchet teeth formed thereupon, said lock member being pivoted on said lever in such a position that said longitudinal portion projects beyond the face of said lever so as to be compressible when said lever is pressed inwardly; and a stationary latch member arranged to be engaged by the outstanding portion of said lock member.

12. In a control lever arrangement of the class described, the combination of: a control lever pivotally sustained and having an opening near the center thereof; a lock member comprising a longitudinal portion and an outstanding portion having ratchet teeth formed thereupon, said lock member being pivoted on said lever in such a position that said longitudinal portion projects beyond the face of said lever so as to be compressible when said lever is pressed inwardly; and a stationary latch member arranged to be engaged by the outstanding portion of said lock member.

In testimony whereof, I have hereunto set my hand at Los Angeles, California, this 1st day of June, 1923.

CLARENCE J. COBERLY.